March 27, 1951 R. TARSHIS 2,546,243

SLIDE RULE WITH FLEXIBLE CALIBRATION-CARRYING ELEMENT

Filed March 4, 1948

INVENTOR.
RALPH TARSHIS
BY
Zoltan Polachek
ATTORNEY

Patented Mar. 27, 1951

2,546,243

UNITED STATES PATENT OFFICE 2,546,243

SLIDE RULE WITH FLEXIBLE CALIBRATION-CARRYING ELEMENT

Ralph Tarshis, Brooklyn, N. Y., assignor of one-third to Sophie Lehman, New York, N. Y., and one-third to David Laub, Brooklyn, N. Y.

Application March 4, 1948, Serial No. 12,915

1 Claim. (Cl. 235—71)

This invention relates to new and useful improvements in calculating devices, and, more particularly, aims to provide a novel and valuable such device of the slide-rule type.

Slide-rules as heretofore proposed have comprised individually non-flexible but relatively movable calibrated members, in combination with a slide equipped with a hair-line by the aid of which result readings are accurately taken. As is well known, in the ordinarily used slide-rule the calibrated members are rigid bar-like elements, these commonly arranged with one mounted on another as by a dovetailing joint for endwise sliding of one member relative to the other. Other and rarer forms of slide-rule, for obtaining greater calculative capacity or for having the calibrations fairly widely divided, have been devised. For instance, such an expedient has been resorted to, as to employ a cylinder as one of the relatively movable calibrated members, with its calibrations arranged along a line extending spirally around the cylinder; or to employ a plurality of discs of differing diameters, these mounted for independent rotation about a pivotal axis common to all the discs, with the various discs circumferentially carrying their calibrations where uncovered by a smaller and overlying disc.

By the present invention, an exceedingly simple and practicable slide-rule is provided, which, essentially is characterized by the use of one or more flexible tapes, these carrying the calibrations. Such a tape or tapes can be made as long as desired, and can be variously mounted, guided and controlled. For instance, where two or more tapes are employed, each tape, when the slide-rule is not in use, may be in exceedingly compact condition, as in a suitable casing, by being coiled endwisely on itself, on a reel, or as though on a reel.

In carrying out the invention as just described, and assuming two tapes are in the combination, each tape could be arranged so as to be normally housed in endwisely coiled condition in its own special casing- subdivision or in its own individual casing; so that, for arranging the tapes with a selected factorial calibration of one matching a selected factorial calibration of the other in correspondence with the calculation desired to be made, the tapes may be withdrawn for straight extension parallel with each other. As thus withdrawn, the matching of said calibrations may be quickly effected, by, for instance, withdrawing each tape to a different extent.

Each tape may be as long as six feet (as for giving six significant digits at the 7–8–9 end), or more; yet with the entire slide-rule when collapsed, by completely recoiling each tape endwisely on itself, so compact that its dimensions need not exceed 3″ x 1¼″ x 2″.

The assumption made above that the number of tapes is two, is not to be taken in limitation of the invention. While two tapes are shown herein, in some of the illustrative embodiments, a greater number of tapes than two would be within the scope of the invention.

Furthermore, according to the invention, only one tape need be used, particularly when this is an endless tape, and a tape carrying calibrations on opposite sides, such tape may be mounted for endwise travel over rollers or other suitable transverse guides in such manner that a selected calibration on one side of the tape, when aligned with a selected calibration on the other side of the tape will bring still another calibration, this expressing the result desired, to a predetermined index point, as opposite a hair-line on a suitable carrier.

For further comprehension of the invention, and of the objects and advantages thereof, reference will be had to the following descriptive and accompanying drawings, and to the appended claim in which the various novel features of the invention are more particularly set forth.

In the accompanying drawings forming a material part of this disclosure:

Figures 1, 2, 3, 4, 5, 6, 7, 8, 9, 10, 11:
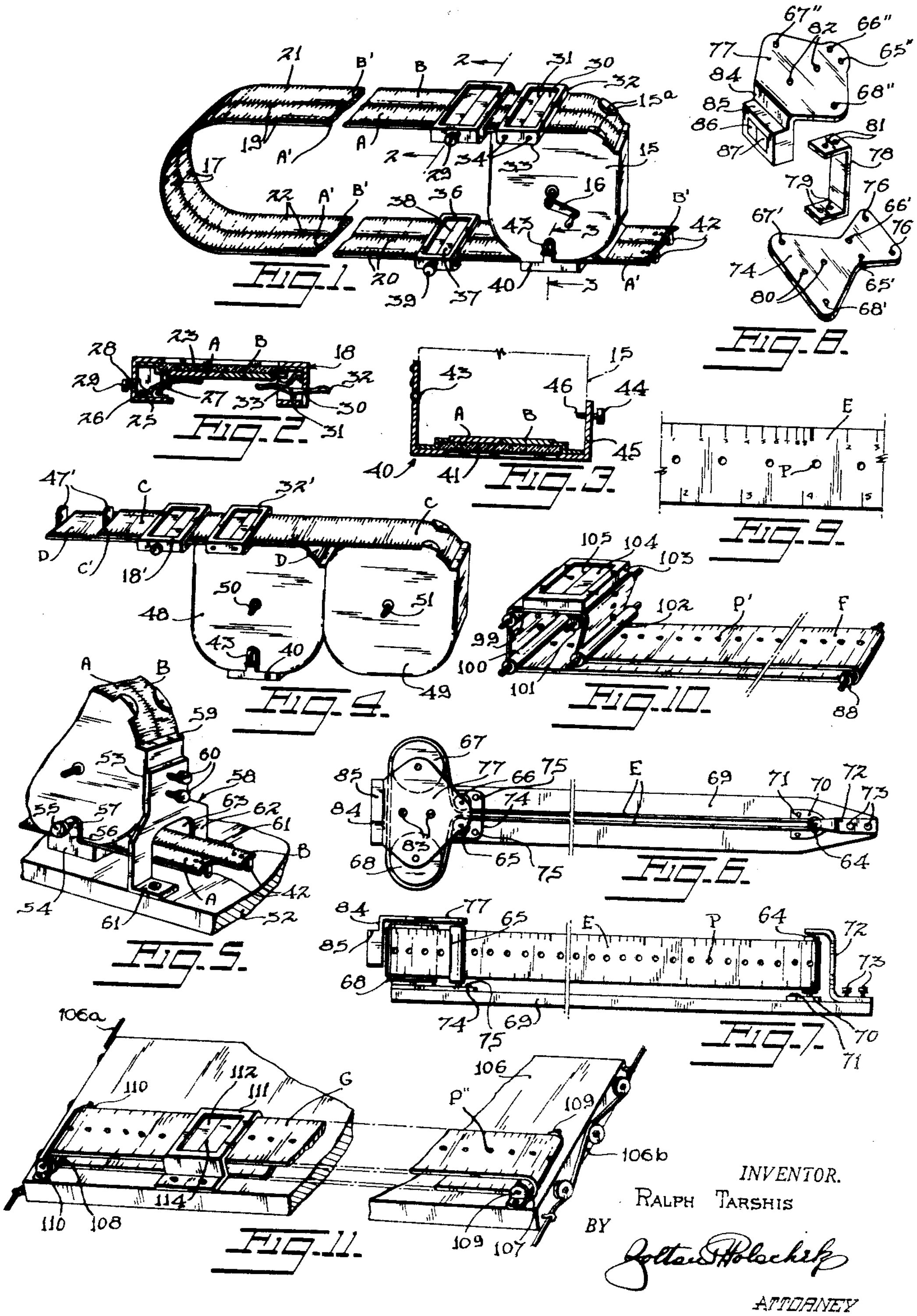
Fig. 1 is a perspective view, showing, in use, an embodiment of the invention having two tapes, and a common casing divided into different subdivisions of which each of the tapes is to be endwisely wound on itself when the slide-rule is collapsed.
Fig. 2 is a detail view, being a transverse vertical section taken on the line 2—2 of Fig. 1.
Fig. 3 is a similar view, being a section taken on the line 3—3 of Fig. 1, but with merely the outline of the casing indicated in dot and dash lines.
Fig. 4 is a perspective view, showing another embodiment having two tapes, but with one tape transparent, and a pair of casings into each of which a different one of the tapes is to be endwisely wound on itself when the slide-rule is collapsed.
Fig. 5 is a fragmentary perspective view, showing the embodiment of Fig. 1 in fixed attachment to a drafting table.
Fig. 6 is a top plan view, showing an embodiment having a single endless tape.
Fig. 7 is a side elevation thereof.
Fig. 8 is an exploded view, showing various fitments for assembly to mount the tape guiding vertical rollers at the left in Figs. 6 and 7.
Fig. 9 is enlarged face view of a portion of the length of said tape, showing, but merely schematically, calibrations thereon; which view of the tape may be taken as reproductive of either a length portion of the outer side of the tape or another length portion of the inner side of the tape.
Fig. 10 is a perspective and somewhat diagrammatic view, showing still another embodiment, and one also of the single tape type.
Fig. 11 is a perspective view, centrally broken away, of a drafting-table straight-edge having mounted thereon still another one-tape embodiment of the invention.

Referring to the drawings more in detail, and first to Figs. 1–3, the two tapes here illustratively shown are respectively designated A and B. These tapes are of thin spring steel. Each is of the kind singly familiar in a familiar form of 6-foot steel measuring-rule where the rule, marked off in inches and fractions of inches, is withdrawable from a casing in which the reel is coiled when the device is collapsed. As in the case of the measuring-rule just mentioned, each of the tapes A and B is resiliently biased to a lateral arching all along its length, as indicated at A′, A′, A′ and B′, B′, B′ in Fig. 1.

Both the tapes A and B, when the slide-rule is collapsed, are housed in a common casing 15, and are individually connected at their inner ends to members inside the casing each fixed to and rotatable with a crank or key at the adjacent side of the casing, one of such keys being shown at 16 in Fig. 1. Thus, by turning either key in the proper direction, the tape A or B may be fed out to extend from the top of the casing to the desired extent.

If the ends of the tapes A and B seen at the lower right in Fig. 1 as in temporary attachment to the bottom of the casing 15, were released from such attachment, the entirety of the lengths of the tapes withdrawn from the case would extend straight and parallel, due to their lateral arching aforesaid. Before the tapes were manually looped back on themselves for temporary attachment to the bottom of the casing, they extended straight and parallel from the latter, and they would have continued thus to extend for greater and greater distances away from the casing the more the tapes were withdrawn therefrom; except that, with the tapes quite long and almost wholly withdrawn, and with the casing held to send them toward horizontal extension, there might be a slight gravity droop at outer limits of their extension.

Even so, the tapes A and B can be easily made to curvilinearly change direction as indicated at 17, so as to be looped back on themselves, when desired, for their just referred to temporary attachment to the bottom of the casing. When thus looped back, the tapes are rigidly self-held along top and bottom stretches of both, as illustrated; which facilitates easy and accurate use of the hair-line carrying means provided, such means including a slide indicated at 18. Where a tape is curled as at 17, it becomes flat laterally, that is, its normally resiliently maintained lateral arching disappears for the time being. Consequently, when the tapes are rewound upon themselves for retraction within the casing 15, all along the wound convolutions said lateral arching disappears, allowing exceedingly compact storage of the tapes in the casing.

As merely schematically indicated at 19, 20, 21 and 22, both tapes A and B may carry one or more lines of calibrations along both sides. These calibrations may be any ones desired, appropriate to calculations for the handling of which the slide-rule is designed. For example, the tape A at its upper side may carry the divisions standard for ordinarily used slide rules, and also squares and cubes; the tape B at its upper side may carry the divisions standard for ordinarily used slide rules and reciprocals; and both tapes at their under sides may carry the logs of sines, cosines, tangents, etc.

In other words, one pair of matching sides of both tapes may carry markings corresponding to those of the usual slide-rule, and other calibrations as well, while the other pair of matching sides of both tapes may have further calibrations for sight-solving any mathematical problem susceptible of solution by use of logarithms or otherwise by the slide-rule method. Preferably, in regard to all calibrations used, main whole numbers are marked in red numerals, and the $\frac{1}{10}$, $\frac{1}{100}$ and $\frac{1}{1000}$ divisions of these whole numbers are marked in black numerals.

For reading a result arrived at by alignment of the selected factorial calibrations on the upper sides of the tapes A and B, the said slide 18 is provided, having suitably mounted therein a glass 23 carrying a hair-line 24.

This slide includes a manually releasable means for normally clamping the slide to the tape A, such means comprising a bell-crank 25 pivoted at 26 and having an operating arm normally clamped against the underside of the tape A by a leaf-spring 27. The shorter arm of said bell-crank has fixedly offset therefrom a post 28 carrying a button 29 which, when pushed inward, frees the slide 18 from the tape A.

The slide 18 also carries a manually operable but normally inoperative means for clamping the slide to the tape B, such means comprising a lever 30 pivoted at 31 and carrying an end portion constituting a depressible finger-piece 32, so that when said finger-piece is depressed the lever 30 is swung, against a leaf-spring 33, to clampingly engage the underside of the tape B.

While relative movement between the tape A and the slide 18 is being effected, the button 29 is held depressed. Then, with the air-line 24 locked properly relative to the tape A, the tape B is given the required endwise movement relative to tape A and the slide. While the result reading is being taken, the finger-piece 32 is held depressed, to avoid shift of the parts.

Fixed to the open top portion of the casing 15, beyond a pair of down-turned tape guiding tabs 15ª, is a glass 30 having a hair-line 31, said glass suitably secured in a framing and holding device 32 having at opposite ends downbent flanges, each like the one shown at 33, for securing said device 32 to the casing 15 at such flanges as indicated at 34. The tapes A and B pass below the glass 30, and then below the glass 23, in being withdrawn from the casing 15; preliminary selection of the relative degrees of extension of the two tapes, required for an intended calculation, being afforded by use of the hair-line 31. The main utility of the hair-line 31, however, is for taking readings one or both of the factorial calibrations whereof is or are close to the outer end of a tape or close to the outer ends of both tapes.

For reading the result arrived at by alignment of selected factorial calibrations on the undersides of the tapes A and B, a second slide 36 may be provided, having a glass 37 carrying a hair-line 38; which slide may be constructed exactly as is the slide 18, with the button 39 of the slide 36 corresponding to the button 29 of the slide 18.

The slide 36 is probably best used with the parts arranged as illustrated in Fig. 1, that is, with the tapes looped back on themselves and retained against the bottom of the casing 15 by a releasable bridging frame 40 within which is fixed a glass 41 having a hair-line for use in the manner first explained above in connection with the hair-line 31, when the calibrations on the undersides of the tapes are to be employed and the outer ends of the tapes are arranged as in Fig. 1.

The bridging frame 40 need not engage the tapes A and B other than somewhat loosely, as, once the curvature 17 along the tapes A and B is established, the lower stretches of the tapes, between such curvature and the bottom of the casing, have a strong tendency to maintain the lengths set up in said lower tape stretches as the result of the placement of said curvature.

When, if desired, the outer ends of the tapes A and B have attached thereto, as by the rivets indicated, L-shaped fitments 42, these last provided to prevent such withdrawal of the tapes A and B into the casing 15 as to free the slide 18 (and also the slide 36 when present) from continued coupling with the casing even after the tapes are retracted into the casing to the full extent predetermined, the bridging frame 40 is desirably so carried by the casing that the outer ends of the tapes, may be readily arranged when desired as shown in Fig. 1 or disengaged from the casing bottom.

Therefore, the bridging frame 40 is shown as having at one end thereof a hinge 43 connected with one side of the casing, and associated with means partially carried at its other end and partially carried by the other side of the casing, for securing the frame 40 as shown, or for allowing it to swing away from the casing about the hinge 43. Said securing and freeing means comprises a knurled-head screw 44 passing through a tapped aperture in an upward extension 45 from an end of the frame 40, and a small recess 46 in the adjacent side of the casing for receiving a terminal rounding on the inner end of the screw shank.

An auxiliary or substitute holding means for the outer ends of the tapes A and B may be provided, as, for example, an Alnico magnetic strip carried by the casing 15 as indicated at 47.

Referring to the form of the invention shown in Fig. 4, the tapes are respectively designated C and D; these being suitably calibrated in any ways desired, in accordance with slide-rule usage or possibilities. For instance, these tapes may be calibrated as explained in connection with the tapes A and B.

One salient difference between this embodiment and that of Figs. 1–3, is that the two tapes are superimposed and housed in and withdrawable from its own individual casing 48 or 49, these casings suitably rigidly interconnected, for maintenance in the tandem relation shown, so that the tape C when variously extended overlies the tape D when variously extended.

Also, the tape C is of transparent material, as of acetate or some other suitable flexible plastic material, so that not only the calibrations thereon may be read, but there may be read at the same time the calibrations on the underlying tape D; which latter tape may be thin steel, as in the case of the tapes A and B, and laterally resiliently arched as explained in connection with the tapes A and B, as indicated at C′.

In this embodiment of Fig. 4, each of the casings 48 and 49, respectively for housing the tapes D and C, may have cranks 50 and 51, each corresponding to the crank 16 seen in Fig. 1; while the parts marked 18′, 32′, 40′, 43′ and 47′ in Fig. 4 correspond, respectively, to the parts 18, 32, 40, 43 and 47.

Referring to the form of the invention shown in Fig. 5, this is illustrated as an adaptation, for instance, of the embodiment of Figs. 1–3, for permitting a slide-rule of the invention to be readily attached to and removed from the top frontal marginal portion of a drafting table 52, whereby with the slide-rule attached to the table, the tapes A and B may be used for calculations, whether looped back and secured under the casing as in Fig. 1, or extended wholly in straight-line extension from the casing while lying absolutely flat on the upper surface of the table.

The casing 15′ of Fig. 5 may be exactly like the casing 15, except that the casing 15′ has a flat vertical outer wall portion 53, and except that the bridging frame 54, corresponding to the frame 40, is, when desired, completely separable from the bottom of the casing, by having means for temporarily attaching the frame 54 to the casing 15′, at both sides of the casing and at both ends of the frame, like the means shown at the right in Fig. 3. That is, at the far side of the frame 54 as seen in Fig. 5, there are parts corresponding to the parts 44—46, and like parts at the near side of the frame 54 as seen in Fig. 5, these last-mentioned parts marked 55, 56 and 57.

The frame 54 is thus made completely separable from the casing 15′, so that the said frame may be cleared away to allow the ends of the tapes A and B to be arranged as shown in Fig. 5 and to be removed from such arrangement, readily, as and when desired, even with the casing secured to the table 52 and with the casing bottom at little if any greater elevation above the table top than the distance measured by the thickness of the frame 54.

The means for securing the casing 15′ to the table 52 is here shown as a bracket 58 having a top portion 59 for direct attachment as by a pair of knurled-head screws 60, to the flat rear wall portion 53 of the casing, and having a pair of foot portions 61 for direct attachment, as by the screws indicated, to the table 52. Below its portion 59 the bracket 58 is bifurcated at 62 in extension toward the foot portions 61, providing an opening 63 through which the outer ends of the tapes A and B may extend as illustrated to the extent required.

Despite the presence of the bracket 58, with the same secured to the casing 15′ and to the table 52, the frame 54 can be readily separated from the casing 15′, for the purpose above stated, merely by fully loosening the screw 55 and the corresponding screw at the opposite end of the frame, and then withdrawing the frame toward the left in Fig. 5 until it has cleared the casing. To reattach the frame to the casing, it is merely moved toward the right in Fig. 5 until in proper straddling relation to the casing bottom, and said screws are tightened.

Referring to the form of the invention illustrated in Figs. 6 to 9, here a single endless tape E is shown, the same suitably guided for endwise travel in either direction, as by means of rollers 64, 65, 66, 67 and 68.

The roller 64 is mounted at one end of a suitable main support, as an elongate board, 69; as by means of journalling the reduced lower ends of said roller in a depression in a metal plate 70 secured as at 71 to the board 69, and by journalling the reduced upper end of said roller in an aperture in the top of a Z-shaped fitment 72 secured to the board 69 by knurled-head screws 73.

All the rollers 65—68 have their reduced lower ends respectively in the respective depressions 65′—68′ in a metal plate 74; such plate attached to the board 69 as by way of screws 75 sent through apertures 76 in the plate 74. All said rollers 65—68 have their reduced upper ends respectively in the respective apertures 65″—68″ in a metal plate 77; the plate 77 being positioned at the required height above the plate 74 by a U-shaped post 78, having, at its bottom limb, apertures 79 matching with tapped apertures 80 in the plate 74 for screw attachment of the post bottom to said plate. The post 78 also has, at its top limb, tapped apertures 81 matching with apertures 82 in the plate 77, whereby the plate 77 may be mounted on the top of the post by screws 83.

Dependent from the plate 77, just beyond the line of travel of the tape E between the larger rollers 67 and 68, is an extension 84 carrying a framing and holding device 85 for a glass 86 carrying a hair-line 87.

As shown in Figs. 7 and 9, the tape E, on the outer side thereof, carries certain of the desired factorial calibrations and also the result-giving calibrations; and on the inner side thereof, carries the cooperant factorial calibrations. These calibrations are so arranged that when any factorial calibration on the outside of either main stretch of the tape is aligned with a complementary factorial calibration on the inside of the other main stretch of the tape, the result-giving calibration on the outside of the tape is aligned with the hair-line 87.

The factorial calibrations are most satisfactorily carried along the upper marginal edges of the tape at both the opposite sides of the latter, so that final checking of accurate alignment of the two complementary factorial calibrations selected is made easier by temporarily slightly arching down the upper edge of the near tape stretch at the point where factorial calibration alignment is to be effected.

The readily removable plate 77 and fitment 72 are present in order to allow easy placement of the tape E properly on the rollers, or to allow its easy removal, as for replacement, or for substituting for the time being another similar tape but one having other calibrations for different calculations than those able to be performed with the tape E.

The tape E is shown as having a line of perforations P for endwisely moving the tape, on insertion in a perforation of a pencil point or stylus. The tape is desirable when made of a longitudinally non-stretchable yet highly flexible material, as the spring steel hereinabove first identified.

Referring to Fig. 10, the form of the invention here shown is a variation from that shown in Figs. 6–9, but one in which also a single flexible tape is employed. Such tape, marked F, is held to endwise movement with main upper and lower stretches horizontal. The tape F is guided for such movement by means of a roller 98 and a group of rollers 99—102, such rollers on horizontal axes and being journalled in suitable supports not shown. A framing device 103 for a glass 104 carrying a hair-line 105 is suitably fixed over the minor upper stretch of the tape which extends between the rollers 99 and 101.

As in Figs. 6–9, the tape F, on the outer side thereof, carries certain of the desired factorial calibrations, and also the result-giving calibrations; and, on the inner side thereof, carries cooperant factorial calibrations. The scale containing the result giving calibrations is ½ the linear length of the factional scale calibrations on one or both sides of the tape F. These calibrations are so arranged that when any factorial calibration on the upper side of the upper main stretch of the tape is aligned with a complementary factorial calibration on the upper side of the lower main stretch of the tape, the result-giving calibration on the upper side of the upper main stretch of the tape is aligned with the hair-line 105.

The factorial calibrations are most satisfactorily carried along the marginal edges of the tape F which are the near edges in Fig. 10, so that final checking of accurate alignment of the two complementary factorial calibrations selected is made easier by slightly arching away from the observer the said near edge of the upper stretch of the tape at the point where factorial calibration alignment is to be effected.

The tape F is shown as having a line of perforations P′, corresponding in function to the perforations P of Fig. 7.

Referring to Fig. 11, the form of the invention here shown is one in which a slide-rule according to the present invention is permanently carried by a straight-edge 106 of the well-known type mounted on a drafting table by means of cords 106ᵃ and 106ᵇ for holding any possible movement of the straight-edge to one in a direction perpendicular to the length of the straight-edge.

In this case also a single flexible tape, G, which may well have a length as great as 10 feet, is illustrated as employed, the same being held merely to a long upper stretch and a long lower stretch, these extending between a roller 107 and a roller 108, with both such rollers journalled in suitable brackets 109 and 110 attached to the straight-edge. The calibrations on both sides of the tape G are arranged in accordance with the principles above explained in connection with the tapes E and F of Figs. 6–10.

A framing device 111 for a glass 112 carrying a hair-line 114 is secured to the straight-edge 106 at a location such that when any factorial calibration on the upper side of the upper stretch of the tape G is aligned with the complementary factorial calibration on the upper side of the lower stretch of the tape, the result-giving calibration on the upper side of the tape is aligned with the hair-line 114.

The tape G is shown as having a line of perforations P″, these also corresponding in function to the perforations P of Fig. 7.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

In a slide rule having an endless flexible tape guided over spaced rollers to have superimposed stretches with one stretch overlying the other and a predetermined line of travel during endwise movement of the tape so that a multiplicity of points along the tape at the outer face thereof may be registered with a different one of a multiplicity of points on the inner face thereof, result-giving calibrations marked along the length of the outer face of the tape, complementary factorial calibrations marked along the length of the inner face of the tape and extended in a direction opposite the markings on the outer face of the tape, said result-giving calibrations being one-half the linear length of the factorial calibrations, and index-means for designating the appropriate result-giving calibrations in accordance with the extent of endwise movement of the tape to register any of the factorial calibrations on one face thereof, said index means being fixed relative to the tape to overlie and be in facial contact with the upper of said superimposed stretches, said tape being formed along its length between said scales with a spaced row of perforations into which a pointed object can be engaged for moving the tape relative to said result index-means.

RALPH TARSHIS.

REFERENCES CITED

The following references are of record in the file of this patent:

UNITED STATES PATENTS

| Number | Name | Date |
|---|---|---|
| 773,675 | Powell et al. | Nov. 1, 1904 |
| 786,102 | Cooper | Mar. 28, 1905 |
| 801,354 | Beckett | Oct. 10, 1905 |
| 870,884 | Holinger | Nov. 12, 1907 |
| 1,426,825 | Dobson | Aug. 22, 1922 |
| 1,777,692 | Fuss | Oct. 7, 1930 |
| 1,936,998 | Summers | Nov. 28, 1933 |
| 1,959,990 | Summers | May 22, 1934 |
| 2,091,661 | Von Forster et al. | Aug. 31, 1937 |
| 2,237,873 | Borok | Apr. 8, 1941 |
| 2,289,257 | Fiala | July 7, 1942 |

FOREIGN PATENTS

| Number | Country | Date |
|---|---|---|
| 628,298 | France | June 27, 1927 |

OTHER REFERENCES

Keuffel and Esser Co.'s Catalogue, 40th ed., page 157, published in 1944 by Keuffel and Esser Co. of 127 Fulton St., N. Y.